United States Patent
Menchero

(10) Patent No.: US 7,249,082 B2
(45) Date of Patent: Jul. 24, 2007

(54) METHOD AND SYSTEM FOR MULTI-PERIOD PERFORMANCE ATTRIBUTION WITH METRIC-PRESERVING COEFFICIENTS

(75) Inventor: Jose Gabriel Menchero, San Francisco, CA (US)

(73) Assignee: Vestek Systems, Inc., San Francisco, CA (US)

( * ) Notice: Subject to any disclaimer, the term of this patent is extended or adjusted under 35 U.S.C. 154(b) by 1317 days.

(21) Appl. No.: 09/848,741

(22) Filed: May 3, 2001

(65) Prior Publication Data
US 2002/0038272 A1   Mar. 28, 2002

Related U.S. Application Data

(63) Continuation-in-part of application No. 09/698,693, filed on Oct. 27, 2000, and a continuation-in-part of application No. 09/613,855, filed on Jul. 11, 2000.

(51) Int. Cl.
G06Q 40/00 (2006.01)

(52) U.S. Cl. ................ 705/36; 705/35; 705/37; 705/38; 705/39

(58) Field of Classification Search ............ 705/35–39
See application file for complete search history.

(56) References Cited

U.S. PATENT DOCUMENTS

| | | | |
|---|---|---|---|
| 5,761,442 A | 6/1998 | Barr et al. ................ 395/236 |
| 5,918,217 A * | 6/1999 | Maggioncalda et al. .. 705/36 R |
| 5,930,762 A | 7/1999 | Masch ............................ 705/7 |
| 6,021,397 A | 2/2000 | Jones et al. ................ 705/36 |
| 6,078,904 A | 6/2000 | Rebane ........................ 705/36 |
| 6,175,824 B1 | 1/2001 | Breitzman et al. ............ 705/36 |
| 6,249,775 B1 | 6/2001 | Freeman et al. .............. 705/36 |

OTHER PUBLICATIONS

Carino, David, "Combining Attribution Effects Over Time," *The Journal of Performance Measurement*, Summer 1999, pp. 5-14.
Menchero, Jose G., "A Fully Geometric Approach to Performance Attribution," *The Journal of Performance Measurement*, Winter 2000/2001, pp. 22-30.
Menchero, Jose G., "An Optimized Approach to Linking Attribution Effects Over Time," *The Journal of Performance Measurement*, Fall 2000, pp. 36-42.

\* cited by examiner

*Primary Examiner*—Nga Nguyen
(74) *Attorney, Agent, or Firm*—Girard & Equitz LLP

(57) ABSTRACT

A method for arithmetic performance attribution which accurately links single-period attribution effects over multiple periods. In preferred embodiments, the method determines portfolio relative performance over multiple time periods (t=1, 2, . . . , T) as a sum of terms of form $$R - \overline{R} = \sum_{it} \lfloor c_1 a_{it} + c_2 a_{it}^2 \rfloor,$$

where $a_{it}$ is a component of active return for period t, the summation over index i is a summation over all components $a_{it}$ for period t, $$R \text{ is } R = \left[\prod_{t=1}^{T}(1+R_t)\right]-1, \quad \overline{R} \text{ is } \overline{R} = \left[\prod_{t=1}^{T}(1+\overline{R}_t)\right]-1,$$

$R_t$ is a portfolio return for period t, $\overline{R}_t$ is a benchmark return for period t, and the coefficients $c_1$ and $c_2$ are $c_1$=A, and Logarithmic Coefficients. (Average Linking Coefficient, 12-month Period)

Optimized Coefficients. (Average Linking Coefficient, 12-month Period)

$$c_2 = \left[ \frac{R - \bar{R} - A \sum_{jt} a_{jt}}{\sum_{jt} a_{jt}^2} \right].$$

More generally, the invention is an arithmetic method for determining portfolio relative performance over multiple time periods (t=1, 2, . . . , T) as a sum of terms of form:

$$R - \bar{R} = \sum_{it} \sum_{k=1}^{\infty} c_k a_{it}^k,$$

where $a_{it}$ is a component of active return for period t. In preferred quadratic implementations (in which the only nonzero coefficients $c_k$ are those for which k=1 or k=2), the coefficients $c_1$ and $c_2$ are defined as in the above-mentioned preferred embodiments. In all embodiments, the method of the invention is metric preserving at the component portfolio level. Other aspects of the invention are a computer system programmed to perform any embodiment of the inventive method, and a computer readable medium which stores code for implementing any embodiment of the inventive method.

6 Claims, 3 Drawing Sheets

Logarithmic
Coefficients.
(Average Linking
Coefficient,
12-month Period)

Optimized
Coefficients.
(Average Linking
Coefficient,
12-month Period)

Logarithmic Coefficients. (Normalized Standard Deviation (%), 12-month Period)

Optimized Coefficients. (Normalized Standard Deviation (%), 12-month Period)

METHOD AND SYSTEM FOR MULTI-PERIOD PERFORMANCE ATTRIBUTION WITH METRIC-PRESERVING COEFFICIENTS

CROSS-REFERENCE TO RELATED APPLICATION

The present application is a continuation-in-part of pending U.S. application Ser. No. 09/698,693, filed on Oct. 27, 2000 (assigned to the assignee of the present application), and a continuation-in-part of pending U.S. application Ser. No. 09/613,855, filed on Jul. 11, 2000 (assigned to the assignee of the present application).

TECHNICAL FIELD OF THE INVENTION

The present invention relates to methods for performing performance attribution to compare the returns of a financial portfolio against those of a benchmark, and attribute the relative performance to various effects resulting from active decisions by the portfolio manager. More particularly, the invention is an improved method for linking single-period attribution effects over multiple periods, using an arithmetic methodology.

BACKGROUND OF THE INVENTION

In performing performance attribution, the returns of a portfolio are compared against those of a benchmark, and the excess return (i.e., relative performance) is attributed to various effects resulting from active decisions by the portfolio managers. Performance attribution is a rich and complex topic, which can be viewed from many angles. There are a variety of conventional methods for performing attribution based on a single-period analysis. However, if performance is measured over an extended length of time, a single-period buy-and-hold analysis may lead to significant errors, especially for highly active portfolios. Therefore, it is imperative to link the single-period attribution effects over multiple periods in an accurate and meaningful way. The two basic approaches that have arisen for such linking are the arithmetic and geometric methodologies.

In arithmetic attribution, the performance of a portfolio relative to a benchmark is given by the difference R−$\bar{R}$, where R and $\bar{R}$ refer to portfolio and benchmark returns, respectively. This relative performance, in turn, is decomposed sector by sector into attribution effects that measure how well the portfolio manager weighted the appropriate sectors and selected securities within the sectors. The sum of the attribution effects gives the performance, R−$\bar{R}$.

In geometric attribution, by contrast, the relative performance is defined by the ratio $(1+R)/(1+\bar{R})$. This relative performance is again decomposed sector by sector into attribution effects. In this case, however, it is the product of the attribution effects that gives the relative performance $(1+R)/(1+\bar{R})$. A recent example of both arithmetic and geometric attribution systems is described in Carino, "Combining Attribution Effects Over Time," *Journal of performance Measurement,* Summer 1999, pp. 5–14 ("Carino").

An advantage of the arithmetic approach is that it is more intuitive. For instance, if the portfolio return is 21% and the benchmark return is 10%, most people regard the relative performance to be 11%, as opposed to 10%. An advantage of geometric attribution, on the other hand, is the ease with which attribution effects can be linked over time.

Carino describes one possible algorithm for linking attribution effects over time that results in a multi-period arithmetic performance attribution system. Furthermore, the result is residual free in that the sum of the linked attribution effects is exactly equal to the difference in linked returns. Carino discloses an arithmetic performance attribution method which determines portfolio relative performance over multiple time periods as a sum of terms of form $(R_t - \bar{R}_t)\beta_t$, where the index "t" indicates one time period, and where Carino's coefficients $\beta_t$ are $$\beta_t^{Carino} = \left[\frac{R-\bar{R}}{\ln(1+R)-\ln(1+\bar{R})}\right]\left(\frac{\ln(1+R_t)-\ln(1+\bar{R}_t)}{R_t - \bar{R}_t}\right).$$

In accordance with the present invention, new coefficients to be defined below replace Carino's coefficients $\beta_t$ (sometimes referred to herein as conventional "logarithmic" coefficients). The inventive coefficients have a much smaller standard deviation than the conventional logarithmic coefficients and are metric preserving. Reducing the standard deviation of the coefficients is important in order to minimize the distortion that arises from overweighting certain periods relative to others.

SUMMARY OF THE INVENTION

In a class of preferred embodiments, the invention is an arithmetic method for determining portfolio relative performance over multiple time periods (t=1, 2, . . . , T) as a sum of terms of form $$R - \bar{R} = \sum_{it} \lfloor c_1 a_{it} + c_2 a_{it}^2 \rfloor,$$

where R is $$R = \left[\prod_{t=1}^{T}(1+R_t)\right] - 1,$$

$\bar{R}$ is $$\bar{R} = \left[\prod_{t=1}^{T}(1+\bar{R}_t)\right] - 1,$$

$R_t$ is a portfolio return for period t, $\bar{R}_t$ is a benchmark return for period t, $a_{it}$ is a component of active return (e.g., issue selection for a given sector) for period t, the components $a_{it}$ for each period t satisfy $$\sum_i a_{it} = R_t - \bar{R}_t,$$

the summation over index i is a summation over all the components $a_{it}$ for period t, the summation over index t is a summation over the time periods, and the coefficients $c_1$ and $c_2$ are respectively $c_1$=A and $$c_2 = \left[ \frac{R - \bar{R} - A \sum_{jt} a_{jt}}{\sum_{jt} a_{jt}^2} \right],$$

where the summation over index j is a summation over all the components $a_{it}$ for period t.

The inventive method is metric preserving at the component level. Preferably, the value A is given by $$A = \frac{1}{T} \left[ \frac{(R - \bar{R})}{(1+R)^{1/T} - (1+\bar{R})^{1/T}} \right] \text{ for } (R \neq \bar{R}), \text{ and}$$

$$A = (1+R)^{(T-1)/T} \text{ for } (R = \bar{R}).$$

and

More generally, the invention is an arithmetic method for determining portfolio relative performance over multiple time periods (t=1, 2, . . . , T) as a sum of terms of form:

$$R - \bar{R} = \sum_{it} \sum_{k=1}^{\infty} c_k a_{it}^k,$$

where $a_{it}$ is a component of active return for period t. In the preferred quadratic case (in which the only nonzero coefficients $c_k$ are those for which k=1 or k=2), the coefficients $c_1$ and $c_2$ are defined as in the above-mentioned preferred embodiments. In all embodiments, the inventive method is metric preserving at the component level.

Other aspects of the invention are a computer system programmed to perform any embodiment of the inventive method, and a computer readable medium which stores code for implementing any embodiment of the inventive method.

BRIEF DESCRIPTION OF THE DRAWINGS

FIG. 1b is a contour plot of average metric preserving coefficients (defined herein) resulting from the same simulations which determined FIG. 1 a.

DETAILED DESCRIPTION OF THE PREFERRED EMBODIMENTS

Figure 1A:
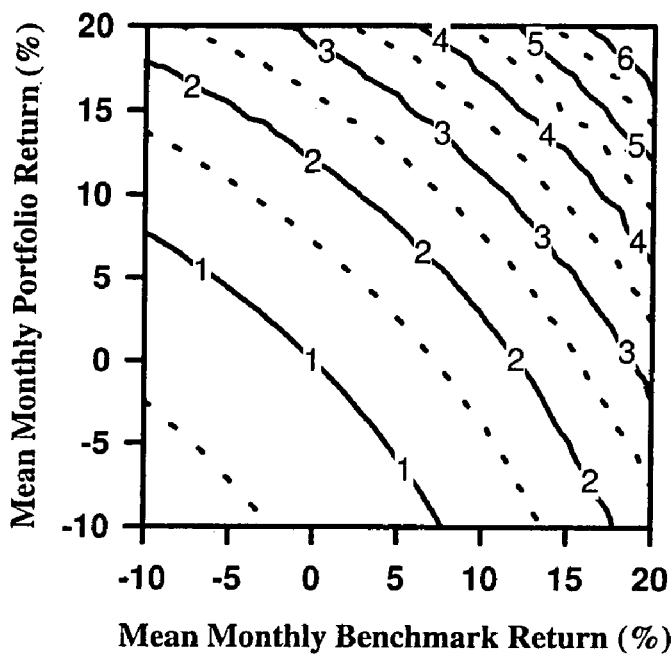
FIG. 1a is a contour plot of the average logarithmic coefficients, determined in accordance with the prior art, resulting from a set of simulations.

The arithmetic performance attribution method of the present invention is an improved approach to arithmetic linking over multiple periods. Preferred embodiments of the invention are based on an optimal distribution of the residual among the different time periods. Such an approach minimizes the distortion that arises from overweighting certain time periods relative to others. The resulting attribution system is also residual free, robust, and completely general, so that performance can be linked without complication for any set of sector weights and returns.

Single-Period Arithmetic Attribution

The portfolio return $R_t$ for a single period t can be written as the weighted average return over N sectors $$R_t = \sum_{i=1}^{N} w_{it} r_{it}, \quad (1)$$

where $w_{it}$ and $r_{it}$ are the portfolio weights and returns for sector i and period t, respectively. For the benchmark, the corresponding returns are $$\bar{R}_t = \sum_{i=1}^{N} \bar{w}_{it} \bar{r}_{it}, \quad (2)$$

with the overbar denoting the benchmark. The arithmetic measure of relative performance is therefore $$R_t - \bar{R}_t = \sum_{i=1}^{N} w_{it} r_{it} - \sum_{i=1}^{N} \bar{w}_{it} \bar{r}_{it}. \quad (3)$$

This difference can be rewritten as $$R_t - \bar{R}_t = \sum_{i=1}^{N} w_{it} r_{it} - \sum_{i=1}^{N} \bar{w}_{it} \bar{r}_{it} + \left[ \sum_{i=1}^{N} w_{it} \bar{r}_{it} - \sum_{i=1}^{N} w_{it} \bar{r}_{it} \right] + \left[ \sum_{i=1}^{N} \bar{w}_{it} \bar{R}_t - \sum_{i=1}^{N} w_{it} \bar{R}_t \right], \quad (4)$$

by noting that the terms in brackets are equal to zero. Combining terms, we obtain the desired result $$R_t - \bar{R}_t = \sum_{i=1}^{N} w_{it}(r_{it} - \bar{r}_{it}) + \sum_{i=1}^{N} (w_{it} - \bar{w}_{it})(\bar{r}_{it} - \bar{R}_t). \quad (5)$$

We interpret the terms in the first summation to be the issue selection $$I_{it}^A = w_{it}(r_{it} - \bar{r}_{it}), \quad (6)$$

with the superscript A denoting arithmetic.

The issue selection $I_{it}^A$ measures how well the portfolio manager picked overperforming securities in sector i during period t.

Similarly, the terms in the second summation of equation (5) we interpret to be the sector selection, $$S_{it}^A = (w_{it} - \bar{w}_{it})(\bar{r}_{it} - \bar{R}_t) \quad (7)$$

which measures the extent to which the manager overweighted the out-performing sectors. The active contribution $A_{it}^A$ is the sum of the issue selection $I_{it}^A$ and sector selection $S_{it}^A$:

$$A_{it}^A = I_{it}^A + S_{it}^A, \quad (8)$$

and gives the contribution of sector i to the performance for period t due to active management decisions.

The above relations allow us to write the net performance for period t as $$R_t - \bar{R}_t = \sum_{i=1}^{N}(I_{it}^A + S_{it}^A) = \sum_{i=1}^{N} A_{it}^A. \quad (9)$$

To summarize, the single-period relative performance has been fully decomposed into attribution effects at the sector level. These attribution effects, when summed over all sectors, give the total excess return for the period, $R_t - \bar{R}_t$.

Multiple-Period Arithmetic Attribution

It is desirable to extend the above analysis to the multiple-period case. The portfolio and benchmark returns linked over T periods are respectively given by $$1 + R = \prod_{t=1}^{T}(1 + R_t), \quad 1 + \bar{R} = \prod_{t=1}^{T}(1 + \bar{R}_t). \quad (10)$$

Just as we define the relative performance for the single-period case by the difference in single-period returns, it is natural to define the relative performance for the multiple-period case as the difference in linked returns, $R - \bar{R}$.

If the returns are small, then the relative performance is approximately given by $$R - \bar{R} \approx \sum_{t=1}^{T}(R_t - \bar{R}_t). \quad (11)$$

However, this approximation breaks down for large returns. A better approach is to multiply the right side of (11) by a constant factor A that takes into account the characteristic scaling which arises from geometric compounding:

$$R - \bar{R} \approx A \sum_{t=1}^{T}(R_t - \bar{R}_t). \quad (12)$$

An obvious possible choice for A is given by $$\frac{R - \bar{R}}{\sum_{t=1}^{T}(R_t - \bar{R}_t)}. \quad (13)$$

However, this naive solution is unacceptable because it does not necessarily reflect the characteristic scaling of the system. Furthermore, it may easily occur that the numerator and denominator of the above expression have opposite sign, in which case the entire linking process loses its underlying meaning.

The value of A that correctly describes such scaling can be found by substituting the mean geometric return $(1+R)^{1/T}-1$ for the single-period returns $R_t$, and similarly for the benchmark. Therefore, in preferred embodiments, A is given by $$A = \frac{1}{T}\left[\frac{(R - \bar{R})}{(1+R)^{1/T} - (1+\bar{R})^{1/T}}\right], \quad (R \neq \bar{R}). \quad (14)$$

Note that A satisfies the required property of being always positive. For the special case $R = \bar{R}$, it is easy to show that the above expression has limiting value $$A = (1+R)^{(T-1)/T}, \quad (R = \bar{R}). \quad (15)$$

In alternative embodiments, A is taken to have some other value. For example, A=1 or $A = [(1+R)(1+\bar{R})]^{1/2}$ in alternative embodiments.

Although (12) is a good approximation with A defined by equations (14) and (15), it still leaves a small residual for general sets of returns. However, we can introduce a set of corrective terms $\alpha_t$ at that distribute the residual among the different periods so that the following equation exactly holds $$R - \bar{R} = \sum_{t=1}^{T}(A + \alpha_t)(R_t - \bar{R}_t). \quad (16)$$

The problem now reduces to calculating the $\alpha_t$. Our objective is to construct a solution for equation (16) that minimizes the distortion arising from overweighting certain periods relative to others. In other words, the $\alpha_t$ should be chosen to be as small as possible. In order to find the optimal solution, we must minimize the function $$f = \sum_{t=1}^{T}\alpha_t^2, \quad (17)$$

subject to the constraint of equation (16). This is a standard problem involving Lagrange multipliers, and the optimal solution is given by $$\alpha_t = \left[ \frac{R - \overline{R} - A \sum_{k=1}^{T} (R_k - \overline{R}_k)}{\sum_{k=1}^{T} (R_k - \overline{R}_k)^2} \right] (R_t - \overline{R}_t). \tag{18}$$

With the $\alpha_1$ thus determined, the linking problem is solved. The optimized linking coefficients, denoted $\beta_t^{Vestek}$, are thus given by $$\beta_t^{Vestek} = A + \alpha_t, \tag{19}$$

with A defined in equations (14) and (15), and $\alpha_t$ given by equation (18). Substituting equation (9) and equation (19) into equation (16) we obtain $$R - \overline{R} = \sum_{t=1}^{T} \sum_{i=1}^{N} \beta_t^{Vestek} (I_{it}^A + S_{it}^A). \tag{20}$$

Observe that this result is fully additive, so that the total performance is defined as a sum of attribution effects, each summed over sectors and time periods. Furthermore, there is no unexplained residual.

The inventor has determined that if one chooses the value of A to be the value determined by equation (14) (or equation (15), if $R=\overline{R}$), the standard deviation of the optimized coefficients of equation (19) is less than that for the logarithmic coefficients disclosed in the above-cited paper by Carino, namely the $\beta_t^{Carino}$ of equation (21), in all simulations performed. Thus, this choice for the value of A guarantees smaller standard deviation among the coefficients $\beta_t^{Vestek}$ than among the logarithmic coefficients taught by Carino.

It is interesting to compare the optimized weighting coefficients $\beta_t^{Vestek}$ of equation (19) to the logarithmic coefficients disclosed by Carino:

$$\beta_t^{Carino} = \left[ \frac{R - \overline{R}}{\ln(1+R) - \ln(1+\overline{R})} \right] \left( \frac{\ln(1+R_t) - \ln(1+\overline{R}_t)}{R_t - \overline{R}_t} \right). \tag{21}$$

The logarithmic coefficients (21) are similar to their optimized counterparts (19) in that both lead to residual-free linking. However, the logarithmic coefficients tend to overweight periods with lower-than-average returns, and to underweight those with higher-than-average returns. This appears to be an artifact of the linking algorithm, and not to be grounded in any economic principle. The optimized coefficients, by contrast, tend to weight each period as evenly as possible.

Figure 1B:
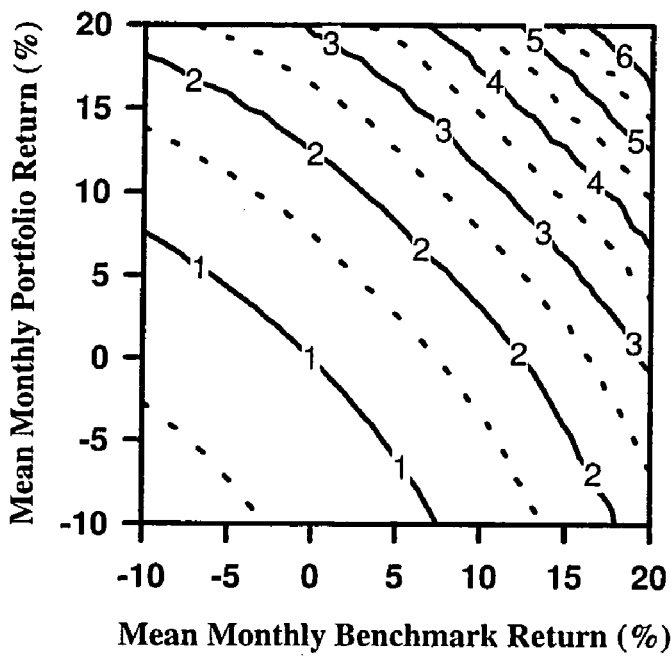

The inventor has conducted a more detailed analysis comparing the optimized coefficients and the conventional logarithmic coefficients, using computational simulations linking single-month attribution effects over a twelve-month period. The portfolio and benchmark returns were drawn from normal distributions, with the standard deviation set equal to the absolute value of the mean return. The portfolio and benchmark distributions were kept fixed for the twelve-month period, and each data point was calculated by averaging the linking coefficients over 1000 sample paths drawn from the same fixed distributions. The mean monthly returns were then varied from −10% to +20%, in order to obtain an understanding of the global behavior of the linking coefficients. Typical annual returns varied from −70% on the low end to +800% on the high end. FIGS. 1a and 1b show results of the simulations, with FIG. 1a being a contour plot of the average logarithmic coefficients and FIG. 1b being a contour plot of the average optimized coefficients. In both cases, the coefficients increase from an average of less than 0.5 for the smallest returns to more than 6.0 for the largest returns. Furthermore, we see that for any combination of portfolio and benchmark returns, the average coefficient is virtually identical in both approaches. Evidently, the reason for this similarity is that the coefficients in the logarithmic algorithm also correctly account for the scaling properties.

A more interesting study, however, is to compare the standard deviation for both sets of coefficients for the same set of returns used in FIGS. 1a and 1b. We first calculate for a single twelve-month period $\hat{\sigma}$, the percent standard deviation of the linking coefficients normalized by the average linking coefficient <β> for that twelve-month period, $$\hat{\sigma} = 100 \frac{\sqrt{\langle \beta^2 \rangle - \langle \beta \rangle^2}}{\langle \beta \rangle}. \tag{22}$$

Figure 2A:
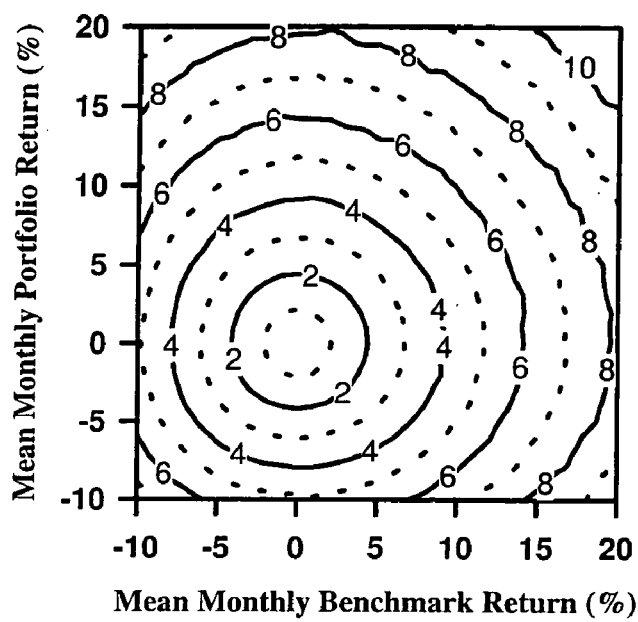
FIG. 2a is plot of normalized standard deviation for the conventional logarithmic coefficients, assuming the same set of distributions that were assumed to generate FIGS. 1a and 1b.
Figure 2B:
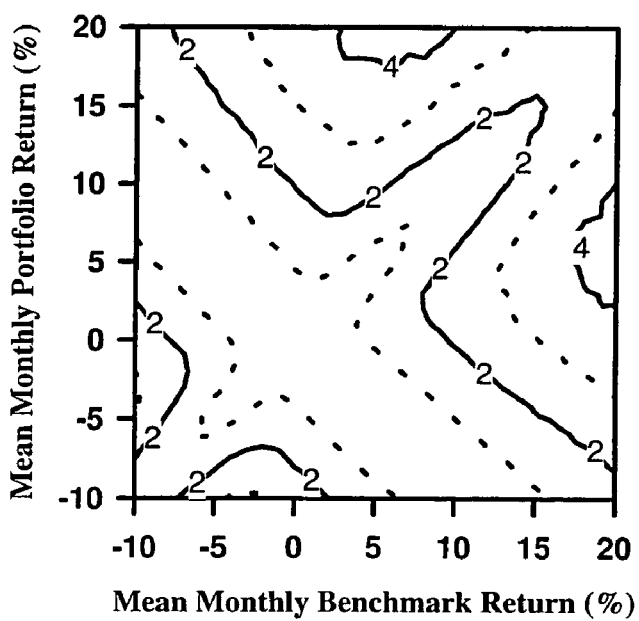
FIG. 2b is plot of normalized standard deviation for a set of metric preserving coefficients (defined herein), assuming the same set of distributions that were assumed to generate FIGS. 1a and 1b.

We then average $\hat{\sigma}$ over 1000 sample paths in order to obtain a good estimate of the average normalized standard deviation of the linking coefficients. The resulting contour plots are presented in FIGS. 2a and 2b. We observe fundamentally distinct behavior for the two cases. For the logarithmic coefficients, the normalized standard deviation increases in concentric circles about the origin, rising to over 10% for the largest returns considered here. By contrast, the optimized coefficients exhibit valleys of extremely low standard deviation extending along the directions $R=\pm\overline{R}$. This property of the optimized coefficients is very appealing because, in the usual case, portfolio returns can be expected to at least roughly track the benchmark returns. In other words, in the usual case, the optimized coefficients have a much smaller standard deviation than the conventional logarithmic coefficients.

Although the results of FIGS. 1a, 1b, 2a, and 2b were obtained for a twelve-month period with specific distributions, the inventor has conducted extensive simulations with different periods and different distributions and has found that the results are entirely consistent with those shown in FIGS. 1a, 1b, 2a, and 2b.

It is natural to ask what kinds of differences might arise in practice between the two sets of linking coefficients. In Table 1 we present a hypothetical set of portfolio and benchmark returns for a six-month period, together with the resulting linking coefficients for the logarithmic and optimized cases. We note that the standard deviation of the optimized coefficients is very small, with the coefficients ranging from roughly 1.41 to 1.42. For the logarithmic case, on the other hand, the coefficients range from 1.26 to 1.54. The linked portfolio and benchmark returns for this example are 64.37% and 39.31%, respectively, for an excess return of 25.06%. In Table 1 we also decompose the single-period relative performance into issue selection $I_t^A$ and sector selection $S_t^A$, where these attribution effects represent the total summed over all sectors. The values were specifically chosen for illustrative purposes with the average single-period issue selection and sector selection being equal.

Applying the logarithmic linking algorithm, we find that the linked issue selection is 10.88%, and that the linked sector selection is 14.18%. Using the optimized coefficients, the corresponding values are 12.52% and 12.54%, respectively. In both cases, the issue selection and sector selection add to give the correct relative performance of 25.06%, so that there is no residual in either method. However, the optimized approach more accurately reflects the fact that, on average, the issue selection and sector selection were equal. Table 1 Comparison of the logarithmic ($\beta_t^{Carino}$) and optimized ($\beta_t^{Vestek}$) coefficients for a hypothetical six-month period. Portfolio and benchmark returns are given by $R_t$ and $\overline{R}_t$, respectively. Also presented are the single-period issue selection $I_t^A$ and sector selection $S_t^A$.

| Period t | $R_t$ (%) | $\overline{R}_t$ (%) | $\beta_t^{Carino}$ | $\beta_t^{Vestek}$ | $I_t^A$ (%) | $S_t^A$ (%) |
|---|---|---|---|---|---|---|
| 1 | 10.0 | 5.0 | 1.409496 | 1.412218 | 2.0 | 3.0 |
| 2 | 25.0 | 15.0 | 1.263177 | 1.410606 | 9.0 | 1.0 |
| 3 | 10.0 | 20.0 | 1.318166 | 1.417053 | −2.0 | −8.0 |
| 4 | −10.0 | 10.0 | 1.520015 | 1.420276 | −13.0 | −7.0 |
| 5 | 5.0 | −8.0 | 1.540243 | 1.409639 | 3.0 | 10.0 |
| 6 | 15.0 | −5.0 | 1.447181 | 1.407383 | 10.0 | 10.0 |

A major advantage of the above-discussed optimized coefficients $\beta_t^{Vestek}=A+\alpha_t$ of equation (16), with $\alpha_t$ defined in equation (14) or (15) and a, defined in equation (18), over the logarithmic coefficients of equation (21) is that the coefficients $\beta_t^{Vestek}=A+\alpha_t$ are metric preserving at the portfolio level, where the expression "metric preserving" at the portfolio level is used in the following sense. For simplicity, we will delete the superscript "Vestek" when referring below to the coefficients $\beta_t^{Vestek}$. The statement that a coefficient $\beta_t$ is "metric preserving" at the portfolio level denotes herein that, for any two periods (t1 and t2) having the same single period active return $(R_{t1}-\overline{R}_{t1})=(R_{t2}-\overline{R}_{t2})$, the quantities $\beta_t(R_t-\overline{R}_t)$ in the total portfolio performance (linked over all time periods) satisfy $\beta_{t1}(R_{t1}-\overline{R}_{t1})=\beta_{t2}(R_{t2}-\overline{R}_{t2})$. Expressed another way, using the optimized coefficients, it is possible to write the active return for the linked case as $$R-\overline{R} = \sum_{t=1}^{T}\left[c_1(R_t-\overline{R}_t) + c_2(R_t-\overline{R}_t)^2\right], \quad (23)$$

where $c_1=A$ and $c_2$ is given by $$c_2 = \left[\frac{R-\overline{R}-A\sum_{j=1}^{T}(R_j-\overline{R}_j)}{\sum_{j=1}^{T}(R_j-\overline{R}_j)^2}\right]. \quad (24)$$

Since $c_1$ and $c_2$ are independent of t, it is clear from equation (23) that two periods which have the same active return will also contribute equally to the active return in the linked case (i.e., the methodology is metric preserving at the portfolio level). In contrast, using the logarithmic coefficients, it is impossible to express the active return for the linked case in the form given by equation (23), and hence the methodology is not metric preserving at the portfolio level.

Before defining a class of embodiments of the invention which employ metric preserving coefficients, we note that although the above-described algorithm employing the optimized coefficients of equation (16) with A defined as in equation (14) or (15) and $\alpha_t$ defined as in equation (18) (the "optimized algorithm") is metric preserving at the portfolio level (so that two periods with the same single period active return contribute the same amount to the active return in the multiple period case), this does not mean that the optimized algorithm is metric preserving at the component level. To appreciate the latter statement, let $a_{it}$ be a component of active return (e.g., issue selection for a given sector) for period t, and let $a_{i't'}$ be another component of active return (for another period t'). Now suppose that $a_{it}=a_{i't'}$, so that the two components contribute the same amount to the relative performance of the single periods. In the linked case, the two attribution effects will contribute $\beta_t a_{it}$ and $\beta_t a_{i't'}$, respectively. Although the optimized coefficients are constructed so that $\beta_t \approx \beta_{t'}$, in general these two linking coefficients will not be identical (unless, of course, the active returns for periods t and t' are the same). Therefore, in general, the optimized algorithm is not strictly metric preserving at the component level (where "metric preserving at the component level" denotes that, for any two components $a_{it}$ and $a_{i't'}$, that satisfy $a_{it}=a_{i't'}$, the two components will contribute equal amounts $\beta_t a_{it}=\beta_{t'} a_{i't'}$ to the linked portfolio performance over all time periods).

In a class of preferred embodiments, the inventive method is a modification of the optimized algorithm, which is metric preserving at the component level. We assume that the components $a_{it}$ for each period must add to give the active return for the period, $$\sum_i a_{it} = R_t - \overline{R}_t. \quad (25)$$

Equation (23) is modified and generalized in accordance with the invention to yield $$R-\overline{R} = \sum_{it}\left[c_1 a_{it} + c_2 a_{it}^2\right], \quad (26)$$

where, as before, $c_1=A$, but now $c_2$ is given by $$c_2 = \left[\frac{R-\overline{R}-A\sum_{jt} a_{jt}}{\sum_{jt} a_{jt}^2}\right]. \quad (27)$$

Because $c_1$ and $c_2$ are independent of period (t) and component index (i), it is clear that equation (26) is metric preserving at the component level. It is within the scope of the invention to determine portfolio performance relative to a benchmark (over multiple time periods t, where t varies from 1 to T) in accordance with equation (26), with $c_1=A$, and $c_2$ determined by equation (27). In preferred ones of such embodiments, the value of A is given by equation (14) for $R \neq \overline{R}$ and by equation (15) for the special case that $R=\overline{R}$. In other embodiments in this class, A is taken to have some other value. For example, A=1 or $A=[(1+R)(1+\overline{R})]^{1/2}$ in some alternative embodiments. Note the if we consider the attribution effect to be the entire active return, then equations (26) and (27) reduce to the familiar results given by equations (23) and (24).

In a more broadly defined class of embodiments of the invention, portfolio performance is determined in accordance with the following generalized version of equation (26), which includes higher order terms (e.g., cubics, quartics, and so on):

$$R - \overline{R} = \sum_{it} \sum_{k=1}^{\infty} c_k a_{it}^k. \quad (28)$$

While equation (28) represents the most general expression for the metric preserving embodiments of the linking methods of the invention, preferred implementations include nonzero coefficients only for the first two terms (k=1 and k=2), and $c_1$ and $c_2$ are as defined in the above-described class of embodiments. In implementations that include terms beyond the quadratic, there is necessarily an increase in the variation from period to period, of the coefficients $A+\alpha_t$ of equation (16) that correspond to the coefficients $c_k$, beyond the variation that would exist in the quadratic implementation.

Figure 3:
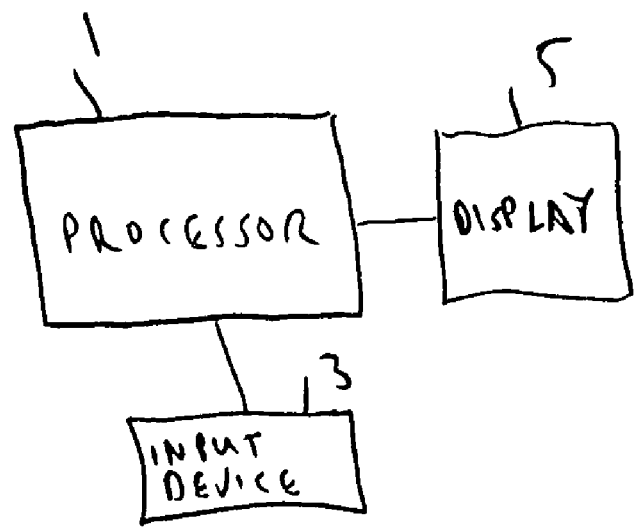
FIG. 3 is a block diagram of a computer system for implementing any embodiment of the inventive method.
Figure 4:
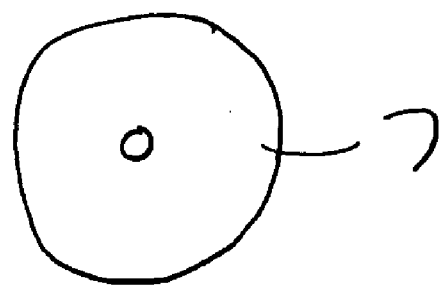
FIG. 4 is an elevational view of a computer readable optical disk on which is stored computer code for implementing any embodiment of the inventive method.

Other aspects of the invention are a computer system programmed to perform any embodiment of the inventive method, and a computer readable medium which stores code for implementing any embodiment of the inventive method. The computer system of FIG. 3 includes processor 1, input device 3 coupled to processor 1, and display device 5 coupled to processor 1. Processor 1 is programmed to implement the inventive method in response to instructions and data entered by user manipulation of input device 3. Computer readable optical disk 7 of FIG. 4 has computer code stored thereon. This code is suitable for programming processor 1 to implement an embodiment of the inventive method.

Although the invention has been described in connection with specific preferred embodiments, various modifications of and variations on the described methods and apparatus of the invention will be apparent to those skilled in the art without departing from the scope and spirit of the invention. For example, in variations of the above-described embodiments, the effects of currency fluctuations in a global portfolio are accounted for.

What is claimed is:

1. An arithmetic performance attribution method for determining portfolio performance, relative to a benchmark, over multiple time periods t, where t varies from 1 to T, comprising the steps of:

(a) determining coefficients $c_1$=A, and $$c_2 = \left[ \frac{R - \overline{R} - A \sum_{jt} a_{jt}}{\sum_{jt} a_{jt}^2} \right],$$

where A has any predetermined value, $a_{jt}$ is a component of active return, the summation over index j is a summation over all components $a_{jt}$ for period t, $$R = \left[ \prod_{t=1}^{T} (1 + R_t) \right] - 1, \quad \overline{R} = \left[ \prod_{t=1}^{T} (1 + \overline{R}_t) \right] - 1,$$

is a portfolio return for period t, $\overline{R}_t$ is a benchmark return for period t, and the components $a_{jt}$ for each period t satisfy $$\sum_{j} a_{jt} = R_t - \overline{R}_t;$$

and (b) determining the portfolio performance as $$R - \overline{R} = \sum_{it} \lfloor c_1 a_{it} + c_2 a_{it}^2 \rfloor,$$

where the summation over index i is a summation over all the terms ($c_1 a_{it} + c_2 a_{it}^2$) for period t.

2. The method of claim 1, wherein A is $$A = \frac{1}{T} \left[ \frac{(R - \overline{R})}{(1 + R)^{1/T} - (1 + \overline{R})^{1/T}} \right],$$

or for the special case $R = \overline{R}$:

$$A = (1+R)^{(T-1)/T}.$$

3. The method of claim 1, wherein A=1.

4. An arithmetic performance attribution method for determining portfolio performance, relative to a benchmark, over multiple time periods t, where t varies from 1 to T, comprising the steps of:

(a) determining a set of coefficients $c_k$, including a coefficient $c_k$ for each positive integer k; and (b) determining the portfolio performance as $$R - \overline{R} = \sum_{it} \sum_{k=1}^{\infty} c_k a_{it}^k,$$

where $a_{it}$ is a component of active return for period t, the summation over index i is a summation over all components $a_{it}$ for period t, $$R = \left[ \prod_{t=1}^{T} (1 + R_t) \right] - 1, \quad \overline{R} = \left[ \prod_{t=1}^{T} (1 + \overline{R}_t) \right] - 1,$$

$R_1$ is a portfolio return for period t, $\overline{R}_t$ is a benchmark return for period t, and the components $a_{it}$ for each period t satisfy $$\sum_{i} a_{it} = R_t - \overline{R}_t,$$

where the summation over index i is a summation over all components $\alpha_{it}$ for said each period t.

5. The method of claim 4, wherein A is $$A = \frac{1}{T}\left[\frac{(R-\bar{R})}{(1+R)^{1/T} - (1+\bar{R})^{1/T}}\right],$$

where $R \neq \bar{R}$, or for the special case $R = \bar{R}$:

$$A = (1+R)^{(T-1)/T}.$$

6. The method of claim 4, wherein $c_k = 0$ for each integer k greater than two, $$c_1 = A, \quad c_2 = \left[\frac{R - \bar{R} - A\sum_j a_{jt}}{\sum_{jt} a_{jt}^2}\right],$$

A has any predetermined value, the summation over index j is a summation over all components $a_{jt}$ for period t, $$R = \left[\prod_{t=1}^{T}(1+R_t)\right] - 1, \quad \bar{R} = \left[\prod_{t=1}^{T}(1+\bar{R}_t)\right] - 1,$$

$R_t$ is a portfolio return for period t, $\bar{R}_t$ is a benchmark return for period t, and the components $a_{jt}$ for each period t satisfy $$\sum_j a_{jt} = R_t - \bar{R}_t.$$

* * * * *

UNITED STATES PATENT AND TRADEMARK OFFICE
CERTIFICATE OF CORRECTION

PATENT NO.         : 7,249,082 B2                                         Page 1 of 1
APPLICATION NO. : 09/848741
DATED               : July 24, 2007
INVENTOR(S)       : Jose Gabriel Menchero It is certified that error appears in the above-identified patent and that said Letters Patent is hereby corrected as shown below:

In Column 12, line 28, insert -- , *where* $R \neq \overline{R}$, -- after

"$A = \dfrac{1}{T}\left[\dfrac{(R-\overline{R})}{(1+R)^{1/T}-(1+\overline{R})^{1/T}}\right]$".

In Column 12, line 58, "$R_1$" should be --$R_f$--.

In Column 12, line 67, "$\alpha_{it}$" should be -- $a_{it}$ --.

Signed and Sealed this

Sixteenth Day of October, 2007

JON W. DUDAS
*Director of the United States Patent and Trademark Office*